(12) United States Patent
Schlueter et al.

(10) Patent No.: US 6,806,337 B2
(45) Date of Patent: Oct. 19, 2004

(54) OPHTHALMIC AND OTORHINOLARYNGOLOGICAL DEVICE MATERIALS

(75) Inventors: Douglas C. Schlueter, Azle, TX (US); Albert R. LeBoeuf, Burleson, TX (US); Mutlu Karakelle, Fort Worth, TX (US)

(73) Assignee: Alcon, Hunenberg (CH)

( * ) Notice: Subject to any disclaimer, the term of this patent is extended or adjusted under 35 U.S.C. 154(b) by 0 days.

(21) Appl. No.: 10/619,904

(22) Filed: Jul. 15, 2003

(65) Prior Publication Data

US 2004/0019131 A1 Jan. 29, 2004

Related U.S. Application Data

(60) Provisional application No. 60/396,201, filed on Jul. 16, 2002.

(51) Int. Cl.[7] ............................................... C08F 222/14
(52) U.S. Cl. .......................... 526/318.43; 526/318.44; 526/319; 526/325; 526/326; 526/347.1; 526/307.6; 526/318.1; 526/318.4; 526/307.7; 351/159; 623/6.11
(58) Field of Search ................ 526/318.43, 318.44, 526/319, 325, 326, 347.1, 307.6, 307.7, 318.1, 318.4; 351/159; 623/6.11

(56) References Cited

U.S. PATENT DOCUMENTS

| | | | |
|---|---|---|---|
| 3,267,084 A | 8/1966 | Rankin | 260/86.1 |
| 3,470,124 A | 9/1969 | Eygen et al. | 260/29.6 |
| 4,138,383 A | 2/1979 | Rembaum et al. | 260/29.7 |
| 5,290,892 A | 3/1994 | Namdaran et al. | 526/259 |
| 5,331,073 A | 7/1994 | Weinschenk, III et al. | 526/264 |
| 5,470,932 A | 11/1995 | Jinkerson | 526/312 |
| 5,693,095 A | 12/1997 | Freeman et al. | 623/6 |
| 5,708,094 A | 1/1998 | Lai et al. | 525/296 |
| 6,528,602 B1 | 3/2003 | Freeman et al. | 526/259 |

FOREIGN PATENT DOCUMENTS

| | | |
|---|---|---|
| EP | 0 485 197 A1 | 5/1992 |
| EP | 1 178 092 A1 | 2/2002 |
| WO | WO 98/27447 | 6/1998 |
| WO | WO 01/18079 | 3/2001 |
| WO | WO 01/18078 A1 | 5/2001 |

OTHER PUBLICATIONS

Boonstra, "Role of Particulate Fillers in Elastomer Reinforcement: A Review," Polymer, vol. 20, pp. 691–704 (1979).

Gu et al., "Preparation of High Strength and Optically Transparent Silicone Rubber," *European Polymer Journal*, vol. 34, pp. 1727–1733 (1998).

Kamiyama et al., "Micro–Sized Polymeric Microsphere by Suspension Polymerization," *J. of Applied Polymer Science*, vol. 50, pp. 107–113 (1993).

*Primary Examiner*—Tatyana Zalukaeva
(74) *Attorney, Agent, or Firm*—Patrick M. Ryan

(57) ABSTRACT

Disclosed are soft, high refractive index, acrylic device materials having improved strength. The materials contain cross-linked acrylate or methacrylate microspheres.

13 Claims, No Drawings

OPHTHALMIC AND OTORHINOLARYNGOLOGICAL DEVICE MATERIALS

This application claims priority to U.S. Provisional Application, U.S. Ser. No. 60/396,201 filed Jul. 16, 2002.

FIELD OF THE INVENTION

This invention is directed to improved ophthalmic and otorhinolaryngological device materials. In particular, this invention relates to soft, high refractive index acrylic device materials that have improved strength.

BACKGROUND OF THE INVENTION

With the recent advances in small-incision cataract surgery, increased emphasis has been placed on developing soft, foldable materials suitable for use in artificial lenses. In general, these materials fall into one of three categories: hydrogels, silicones, and acrylics.

In general, hydrogel materials have a relatively low refractive index, making them less desirable than other materials because of the thicker lens optic necessary to achieve a given refractive power. Silicone materials generally have a higher refractive index than hydrogels, but tend to unfold explosively after being placed in the eye in a folded position. Explosive unfolding can potentially damage the corneal endothelium and/or rupture the natural lens capsule. Acrylic materials are desirable because they typically have a high refractive index and unfold more slowly or controllably than silicone materials.

U.S. Pat. No. 5,290,892 discloses high refractive index, acrylic materials suitable for use as an intraocular lens ("IOL") material. These acrylic materials contain, as principal components, two aryl acrylic monomers. The IOLs made of these acrylic materials can be rolled or folded for insertion through small incisions.

U.S. Pat. No. 5,331,073 also discloses soft acrylic IOL materials. These materials contain as principal components, two acrylic monomers which are defined by the properties of their respective homopolymers. The first monomer is defined as one in which its homopolymer has a refractive index of at least about 1.50. The second monomer is defined as one in which its homopolymer has a glass transition temperature less than about 22° C. These IOL materials also contain a cross-linking component. Additionally, these materials may optionally contain a fourth constituent, different from the first three constituents, which is derived from a hydrophilic monomer. These materials preferably have a total of less than about 15% by weight of a hydrophilic component.

U.S. Pat. No. 5,693,095 discloses foldable, high refractive index ophthalmic lens materials containing at least about 90 wt. % of only two principal components: one aryl acrylic hydrophobic monomer and one hydrophilic monomer. The aryl acrylic hydrophobic monomer has the formula

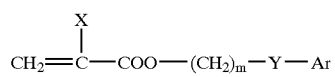

wherein: X is H or $CH_3$;
m is 0–6;
Y is nothing, O, S, or NR, wherein R is H, $CH_3$, $C_nH_{2n+1}$ (n=1–10), iso-$OC_3H_7$, $C_6H_5$, or $CH_2C_6H_5$; and
Ar is any aromatic ring which can be unsubstituted or substituted with $CH_3$, $C_2H_5$, n-$C_3H_7$, iso-$C_3H_7$, $OCH_3$, $C_6H_{11}$, Cl, Br, $C_6H_5$, or $CH_2C_6H_5$.

The lens materials described in the '095 Patent preferably have a glass-transition temperature ("$T_g$") between about −20 and +25° C.

Flexible intraocular lenses may be folded and inserted through a small incision. In general, a softer material may be deformed to a greater extent so that it can be inserted through an increasingly smaller incision. Soft acrylic or methacrylic materials typically do not have an appropriate combination of strength and flexibility to permit IOLs to be inserted through an incision as small as that required for silicone IOLs. The mechanical properties of silicone elastomers are improved by addition of an inorganic filler, typically surface treated silica. Surface treated silica improves the mechanical properties of soft acrylic rubbers, too, but reduces the optical clarity of the finished product. Alternative filler materials having a refractive index closer to soft acrylic rubber are needed.

The addition of reinforcing fillers to soft polymers is known to improve tensile strength and tear resistance. Reinforcement stiffens the polymer and improves its toughness by restricting the local freedom of movement of polymer chains, and strengthens the structure by introducing a network of weak fix points. The reinforcing ability of a particular filler depends upon its characteristics (e.g. size and surface chemistry), the type of elastomer with which it is used, and the amount of filler present. Conventional fillers include carbon black and silicate fillers, where the particle size (for maximum surface area) and wettability (for strength of cohesion) are of primary importance. Covalent chemical bonding between the matrix and the filler is generally not required for effective reinforcement. For a recent application and review see: Boonstra, "Role of particulate fillers in elastomer reinforcement: a review" *Polymer* 1979, 20, 691, and Gu, et al., "Preparation of high strength and optically transparent silicone rubber" *Eur. Polym. J.* 1998, 34, 1727.

SUMMARY OF THE INVENTION

Improved soft, foldable acrylic device materials which are particularly suited for use as IOLs, but which are also useful as other ophthalmic or otorhinolaryngological devices, such as contact lenses, keratoprostheses, corneal rings or inlays, otological ventilation tubes and nasal implants, have been discovered. These polymeric materials contain microspheres dispersed throughout the polymer network. The presence of the microspheres improves the strength and influences the surface properties of the polymeric materials compared to similar materials without the microspheres.

DETAILED DESCRIPTION OF THE INVENTION

Unless indicated otherwise, all component amounts are presented on a % (w/w) basis.

The materials of the present invention are self-reinforced polymeric materials. The materials can be made by the radical polymerization of a monofunctional acrylate or methacrylate monomer (1) and a difunctional acrylate or methacrylate cross-linking monomer in the presence of a cross-linked acrylate, or methacrylate microsphere (2).

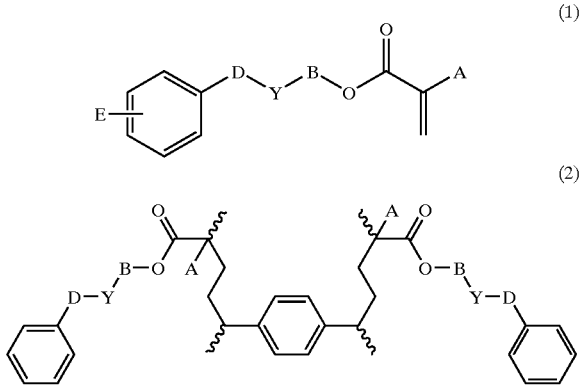

wherein:

A=H, $CH_3$, $CH_2CH_3$, $CH_2OH$;

B=$(CH_2)_m$ or $[O(CH_2)_2]_n$;

D=$(CH_2)_w$;

m=2–6;

n=1–10;

Y is nothing, O, S, or NR, provided that if Y is O, S, or NR, then B is $(CH_2)_m$;

R is H, $CH_3$, $C_nH_{2n+1}$ (n=1–10), iso-$OC_3H_7$, $C_6H_5$, or $CH_2C_6H_5$;

w=0–6, provided that m+w≦8; and

E is H, $C_1$–$C_4$ alkyl, $C_1$–$C_4$ alkoxy, $C_6H_5$, $CH_2C_6H_5$, or F, Cl, Br.

The copolymer materials of the present invention are cross-linked. The copolymerizable cross-linking agent used in the copolymers of this invention may be any terminally ethylenically unsaturated compound having more than one unsaturated group. Suitable cross-linking agents include, for example: ethylene glycol dimethacrylate; diethylene glycol dimethacrylate; allyl methacrylate; 1,3-propanediol dimethacrylate; 2,3-propanediol dimethacrylate; 1,6-hexanediol dimethacrylate; 1,4-butanediol dimethacrylate; $CH_2$=$C(CH_3)C(O)O(CH_2CH_2O)_n$—$C(O)C(CH_3)$=$CH_2$ where n=1–50; $CH_2$=$C(CH_3)C(O)O(CH_2)_tO$—$C(O)C(CH_3)$=$CH_2$ where t=3–20; and their corresponding acrylates.

Monomers of formula (1) are known and are commercially available or can be made using known methods. See, for example, Namdaran, et al., U.S. Pat. No. 5,290,892, Eygen, et al., U.S. Pat. No. 3,470,124, and Rankin, et al., U.S. Pat. No. 3,267,084. Preferred monomers of formula (1) are 2-phenylethyl acrylate, 2-phenylethyl methacrylate and mixtures thereof. Microspheres of formula (2) can be made by methods known in the art, for example by emulsion or suspension polymerization (see, e.g., Kuriyama et al., *J. Appl Poly. Sci.* 1993, 50, 107; Rembaum et al., U.S. Pat. No. 4,138,383;). The microspheres will generally range in size from 0.01–1000 μm (average diameter). As known in the art, cross-link density of the microspheres (2) can be adjusted by the concentration of cross-linking agent in the microsphere polymer. Generally, the cross-link density is 1–10%.

In order to form a flexible material the concentration of each component (1) and (2) depends on (a) the glass transition temperature of the homopolymer formed from monomer (1), (b) the concentration of the difunctional cross-linker, and, to a lesser extent, (c) the concentration of the microsphere (2). A typical range for the concentration of (1) is 75–98%. The amount of the difunctional cross-linker concentration is 0.1–5%, and preferably about 1%. The microsphere concentration is typically 1–20%. A radical initiator is used to initiate polymerization of the lens material formulation by the action of either heat or radiation.

The addition of polymeric microspheres not only permits modification of mechanical properties and also effects a reduction in surface tackiness. The composite properties may be adjusted by balancing network and filler components, and selecting microsphere concentration, size, composition, surface functionalization, and cross-link density. For the best clarity, the amount and size of the microsphere component in the formulation should be minimized as clarity can be adversely affected when higher concentrations of microspheres and/or microspheres that are larger than the wavelength of light are used. Preferably, the microsphere concentration in the lens material of the present invention is 1–5%.

In addition to components (1), and (2), the lens material of the present invention may also contain a total of up to about 10% by weight of additional components which serve other purposes, such as reactive UV and/or blue-light absorbers. A preferred reactive UV absorber is 2-(2'-hydroxy-3'-methallyl-5'-methylphenyl)benzotriazole, commercially available as o-Methallyl Tinuvin P ("oMTP") from Polysciences, Inc., Warrington, Pa. UV absorbers are typically present in an amount from about 0.1–5% (weight). Suitable reactive blue-light absorbing compounds include those described in U.S. Pat. No. 5,470,932. Blue-light absorbers are typically present in an amount from about 0.01–0.5% (weight).

Suitable polymerization initiators include thermal initiators and photoinitiators. Preferred thermal initiators include peroxy free-radical initiators, such as t-butyl (peroxy-2-ethyl)hexanoate and di-(tert-butylcyclohexyl) peroxydicarbonate (commercially available as Perkadox® 16 from Akzo Chemicals Inc., Chicago, Ill.). Particularly in cases where the materials of the present invention do not contain a blue-light absorbing chromophore, preferred photoinitiators include benzoylphosphine oxide initiators, such as 2,4,6-trimethyl-benzoyldiphenyl-phosphine oxide, commercially available as Lucirin® TPO from BASF Corporation (Charlotte, N.C.). Initiators are typically present in an amount of about 5% (weight) or less.

The particular combination of the ingredients described above and the identity and amount of any additional components are determined by the desired properties of the finished ophthalmic device material. Preferably, the ingredients and their proportion are selected so that the improved acrylic lens materials of the present invention possess the following properties, which make the materials of the present invention particularly suitable for use in IOLs which are to be inserted through incisions of 4 mm or less.

The lens material preferably has a refractive index in the dry state of at least about 1.50 as measured by an Abbe' refractometer at 589 nm (Na light source). Optics made from materials having a refractive index lower than 1.50 are necessarily thicker than optics of the same power which are made from materials having a higher refractive index. As such, IOL optics made from materials having a refractive index lower than about 1.50 generally require relatively larger incisions for IOL implantation.

The glass-transition temperature ("Tg") of the lens material, which affects the material's folding and unfolding characteristics, is preferably less than about +25° C., and more preferably less than about +15° C. Tg is measured by differential scanning calorimetry at 10° C./min., and is generally determined at the midpoint of the transition of the heat flux curve. "Tg" and "Tg (mid)" both refer to the Tg taken at the midpoint of the transition of the heat flux curve. "Tg (start)" refers to the Tg taken at the beginning of the transition of the heat flux curve; "Tg (end)" refers to the Tg taken at the end of the transition of the heat flux curve.

The lens material will have an elongation of at least 200%, preferably between 300 and 800%. This property indicates that the lens generally will not crack, tear or split when folded. Elongation of polymer samples is determined on dumbbell shaped tension test specimens with a 20 mm total length, length in the grip area of 4.88 mm, overall width of 2.49 mm, 0.833 mm width of the narrow section, a fillet radius of 8.83 mm, and a thickness of 0.9 mm. Testing is performed on samples at standard laboratory conditions of 23±2° C. and 50±5% relative humidity using an Instron Material Tester model 4400 with a 50 N load cell. The grip distance is set at 14 mm and a crosshead speed is set at 20 mm/minute and the sample is pulled to failure. The elongation (strain) is reported as a fraction of the displacement at failure to the original grip distance ("Elongation"). The modulus is calculated as the instantaneous slope of the stress-strain curve at 100% strain ("100% Modulus). "300% Modulus" is calculated as the instantaneous slope of the stress-strain curve at is 300% strain. Stress is calculated at the maximum load for the sample, typically the load when the sample breaks, assuming that the initial area remains constant. This stress is recorded as "stress at break" in the examples below. Tear resistance was measured on unnicked 90° C. angle specimens (Die C) according to ASTMD624-91 "Standard Test Method for Tear Strength of Conventional Vulcanized Rubber and Thermoplastic Elastomers". The test specimens were 20 mm total length, 9.0 mm guage length and a thickness of 0.9 mm. Testing was performed on samples at standard laboratory conditions of 23±2° C. using an Instron Material Tester model 4400 with a 50 N load cell. The grip distance was set at 9.0 mm and a crosshead speed is set at 500 mm/minute and the sample was pulled to failure. The tear resistance was calculated from the maximum force obtained during testing divided by the sample thickness.

IOLs constructed of the materials of the present invention can be of any design capable of being rolled or folded into a small cross section that can fit through a relatively smaller incision. For example, the IOLs can be of what is known as a one piece or multipiece design, and comprise optic and haptic components. The optic is that portion which serves as the lens and the haptics are attached to the optic and are like arms which hold the optic in its proper place in the eye. The optic and haptic(s) can be of the same or different material. A multipiece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

In addition to IOLs, the materials of the present invention are also suitable for use as other ophthalmic or otorhinolaryngological devices such as contact lenses, keratoprostheses, corneal inlays or rings, otological ventilation tubes and nasal implants.

The invention will be further illustrated by the following examples, which are intended to be illustrative, but not limiting.

Examples 1–8

Preparation of Device Materials

Poly(2-phenylethyl methacrylate)/5% divinyl benzene microspheres (0.1–1.0 µm) ("2-PEMA MS") were obtained from Polysciences, Inc., Warrington, Pa. The formulation components (Table 1) were combined in a 20 mL scintillation vial. The microsphere containing formulations were agitated for about 3 hrs. Brief sonication (<3 min) was also used to aid dissolution in the methacrylate composite formulations. A polymerization initiator was added (Benzoyl peroxide (BPO) for thermal cure and Darocur 1173 for UV cure) and the mixture agitated until the initiator dissolved. The mixture was transferred to polypropylene 20×10×1 mm slab molds. The molds were clamped with binder clips and cured. The formulations containing BPO or Perkadox-16 were cured in a mechanical convection oven for 1 hr at 70° C., then 2 hrs. at 110° C. The formulation containing Darocur 1173 was cured by UV radiation for 1 hr. The cured materials were extracted in acetone for 3 hr at reflux then decanted and rinsed with fresh acetone, then dried under vacuum at 60° C. for at least 3 hrs. The amount of extractables was determined gravimetncally. Representative properties are listed in Table 1.

TABLE 1

| Example: | 1 | 2 | 3 | 4 | 5 |
|---|---|---|---|---|---|
| 2-PEA | 86.3 | 86.3 | 95.1 | — | — |
| 5-PPMA | — | — | — | 86.3 | 95.0 |
| 2-PEMA | — | — | — | — | — |
| 2-PEMA MS | 8.7 | 8.7 | — | 8.7 | — |
| PEO600DMA | 5.0 | 5.0 | 4.9 | 5.0 | 5.0 |
| BPO | 1.0 | — | 1.0 | 1.0 | 1.0 |
| Darocur 1173 | — | 1.0 | — | — | — |
| Acetone extractables (%) | 1.30 | 2.78 | 2.16 | 1.32 | 1.30 |
| Clarity | hazy | good | excellent | hazy | excellent |
| Stress at break (MPa) | 2.375 | 3.315 | 2.735 | 2.597 | 3.071 |
| Elongation (%) | 474 | 707 | 706 | 353 | 552 |
| Young's modulus (MPa) | 0.546 | 0.442 | 0.337 | 1.717 | 1.376 |
| 100% Modulus (MPa) | 0.428 | 0.403 | 0.225 | 1.103 | 0.812 |
| 300% Modulus (MPa) | 0.413 | 0.257 | 0.217 | 0.744 | 0.476 |
| Tear resistance (N/mm) | 1.736 | 1.826 | 1.311 | 2.774 | 2.555 |

| Example: | 6 | 7 | 8 |
|---|---|---|---|
| 2-PEA | 67.0 | 67.0 | 66.9 |
| 5-PPMA | — | — | — |
| 2-PEMA | 28.0 | 31.0 | 32.0 |
| 2-PEMA MS | 4.0 | 1.0 | — |
| BDDA | 1.0 | 1.0 | 1.0 |
| BPO | — | — | — |
| Darocur 1173 | — | — | — |
| Perkadox-16 | 1.0 | 1.0 | 1.0 |
| Acetone extractables (%) | 1.24 | 0.88 | 1.06 |
| Clarity | good | excellent | excellent |
| Stress at break (MPa) | 5.755 | 4.698 | 6.064 |
| Elongation (%) | 889 | 946 | 1018 |
| Young's modulus (MPa) | 2.325 | 1.460 | 1.878 |
| 100% Modulus (MPa) | 1.206 | 0.823 | 1.068 |
| 300% Modulus (MPa) | — | — | — |
| Tear resistance (N/mm) | 3.089 | 2.863 | 2.789 |

2-PEA: 2-phenylethyl acrylate
5-PPMA: 5-phenylpentyl methacrylate
2-PEMA: 2-phenylethyl methacrylate
PEO600DMA: polyethylene oxide (number avg. MW = 600) dimethacrylate
BDDA: 1,4-butanediol diacrylate The data presented in Table 1 illustrates the advantageous effect on tear resistance that the addition of microspheres provides.

This invention has been described by reference to certain preferred embodiments; however, it should be understood that it may be embodied in other specific forms or variations thereof without departing from its special or essential characteristics. The embodiments described above are therefore considered to be illustrative in all respects and not restrictive, the scope of the invention being indicated by the appended claims rather than by the foregoing description.

We claim:

1. A self-reinforced polymeric material comprising (a) a monofunctional acrylate or methacrylate monomer of formula (1), (b) a difunctional acrylate or methacrylate cross-linking monomer, and (c) a cross-linked acrylate or methacrylate microsphere of formula (2):

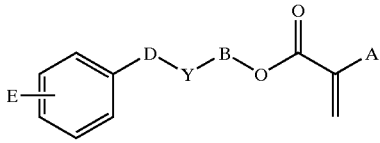

(1)

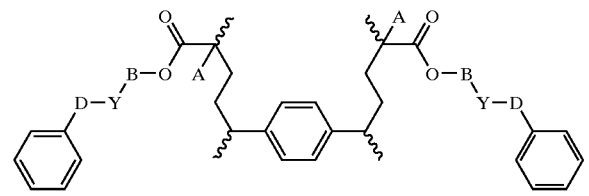

(2)

wherein:
A=H, $CH_3$, $CH_2CH_3$, $CH_2OH$;
B=$(CH_2)_m$ or $[O(CH_2)_2]_n$;
D=$(CH_2)_w$;
m=2–6;
n=1–10;
Y is nothing, O, S, or NR, provided that if Y is O, S, or NR, then B is $(CH_2)_m$;
R is H, $CH_3$, $C_nH_{2n+1}$ (n=1–10), iso-$OC_3H_7$, $C_6H_5$, or $CH_2C_6H_5$;
w=0–6, provided that m+w≦8; and
E is H, $C_1$–$C_4$ alkyl, $C_1$–$C_4$ alkoxy, $C_6H_5$, $CH_2C_6H_5$, or F, Cl, Br.

2. The polymeric material of claim 1 wherein the material is made by radical polymerization of the monofunctional acrylate or methacrylate monomer of formula (1) and the difunctional acrylate or methacrylate cross-linking monomer in the presence of the cross-linked acrylate, or methacrylate microsphere of formula (2).

3. The polymeric material of claim 1 wherein the difunctional acrylate or methacrylate cross-linking monomer (b) is selected from the group consisting of ethylene glycol dimethacrylate; diethylene glycol dimethacrylate; allyl methacrylate; 1,3-propanediol dimethacrylate; 2,3-propanediol dimethacrylate; 1,6-hexanediol dimethacrylate; 1,4-butanediol dimethacrylate; $CH_2$=$C(CH_3)C(O)O(CH_2CH_2O)_n$—$C(O)C(CH_3)$=$CH_2$ where n=1–50; $CH_2$=$C(CH_3)C(O)O(CH_2)_tO$—$C(O)C(CH_3)$=$CH_2$ where t=3–20; and their corresponding acrylates.

4. The polymeric material of claim 1 wherein the polymeric material comprises 75–98% (w/w) of the monofunctional acrylate or methacrylate monomer of formula (1), 0.1–5% (w/w) of the difunctional acrylate of methacrylate cross-linking monomer, and 1–20% (w/w) of the cross-linked acrylate or methacrylate microsphere of formula (2).

5. The polymeric material of claim 4 wherein the polymeric material comprises 1–5% (w/w) of the cross-linked acrylate or methacrylate microsphere of formula (2).

6. The polymeric material of claim 1 wherein the material further comprises an ingredient selected from the group consisting of reactive UV absorbers and reactive blue-light absorbers.

7. An ophthalmic or otorhinolaryngological device selected from the group consisting of intraocular lenses; contact lenses; keratoprostheses; corneal rings or inlays; otological ventilation tubes; and nasal implants, wherein the device comprises a self-reinforced polymeric material comprising (a) a monofunctional acrylate or methacrylate monomer of formula (1), (b) a difunctional acrylate or methacrylate cross-linking monomer, and (c) a cross-linked acrylate or methacrylate microsphere of formula (2):

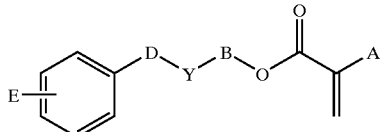

(1)

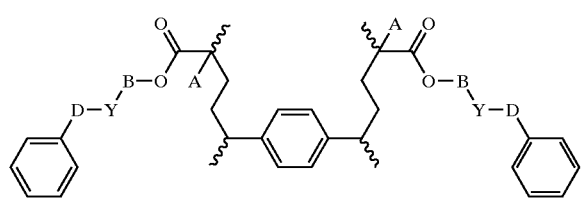

(2)

wherein:
A=H, $CH_3$, $CH_2CH_3$, $CH_2OH$;
B=$(CH_2)_m$ or $[O(CH_2)_2]_n$;
D=$(CH_2)_w$;
m=2–6;
n=1–10;
Y is nothing, O, S, or NR, provided that if Y is O, S, or NR, then B is $(CH_2)_m$;
R is H, $CH_3$, $C_nH_{2n+1}$ (n=1–10), iso-$OC_3H_7$, $C_6H_5$, or $CH_2C_6H_5$;
w=0–6, provided that m+w≦8; and
E is H, $C_1$–$C_4$ alkyl, $C_1$–$C_4$ alkoxy, $C_6H_5$, $CH_2C_6H_5$, or F, Cl, Br.

8. The ophthalmic or otorhinolaryngological device of claim 7 wherein the self-reinforced polymeric material is made by radical polymerization of the monofunctional acrylate or methacrylate monomer of formula (1) and the difunctonal acrylate or methacrylate cross-linking monomer in the presence of the cross-linked acrylate, or methacrylate microsphere of formula (2).

9. The ophthalmic or otorhinolaryngological device of claim 7 wherein the difunctional acrylate or methacrylate cross-linking monomer (b) is selected from the group consisting of ethylene glycol dimethacrylate; diethylene glycol dimethacrylate; allyl methacrylate; 1,3-propanediol dimethacrylate; 2,3-propanediol dimethacrylate; 1,6-hexanediol dimethacrylate; 1,4-butanediol dimethacrylate; $CH_2$=$C(CH_3)C(O)O(CH_2CH_2O)_n$—$C(O)C(CH_3)$=$CH_2$ where n=1–50; $CH_2$=$C(CH_3)C(O)O(CH_2)_tO$—$C(O)C(CH_3)$=$CH_2$ where t=3–20; and their corresponding acrylates.

10. The ophthalmic or otorhinolaryngological device of claim 7 wherein the self-reinforced polymeric material comprises 75–98% (w/w) of the monofunctional acrylate or methacrylate monomer of formula (1), 0.1–5% (w/w) of the difunctional acrylate of methacrylate cross-linking monomer, and 1–20% (w/w) of the cross-linked acrylate or methacrylate microsphere of formula (2).

11. The ophthalmic or otorhinolaryngological device of claim 10 wherein the self-reinforced polymeric material comprises 1–5% (w/w) of the cross-linked acrylate or methacrylate microsphere of formula (2).

12. The ophthalmic or otorhinolaryngological device of claim 11 wherein the self-reinforced polymeric material further comprises an ingredient selected from the group consisting of reactive UV absorbers and reactive blue-light absorbers.

13. The ophthalmic or otorhinolaryngological device of claim 7 wherein the self-reinforced polymeric material comprises 65–70% (w/w) of 2-phenylethyl acrylate, 25–33% (w/w) of 2-phenylethyl methacrylate, 1–4% (w/w) of cross-linked 2-phenylethyl methacrylate microspheres having an average diameter 0.1–1 $\mu$m, and 0.5–1.5% (w/w) of a difunctional acrylate or methacrylate cross-linking monomer.

* * * * *